United States Patent
Boos et al.

(10) Patent No.: US 9,526,074 B2
(45) Date of Patent: Dec. 20, 2016

(54) METHODS AND APPARATUS FOR DETERMINING A TRANSMIT ANTENNA GAIN AND A SPATIAL MODE OF A DEVICE

(71) Applicant: Google Technology Holdings LLC, Mountain View, CA (US)

(72) Inventors: John P. Boos, Grayslake, IL (US); Krishna K. Bellamkonda, Lake Zurich, IL (US); Pierre Muratory, Tournefeuille (FR); Nischal Y. Patel, Gilberts, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 141 days.

(21) Appl. No.: 14/195,074

(22) Filed: Mar. 3, 2014

(65) Prior Publication Data
US 2014/0323141 A1 Oct. 30, 2014

Related U.S. Application Data

(60) Provisional application No. 61/790,021, filed on Mar. 15, 2013.

(51) Int. Cl.
*H04W 52/24* (2009.01)
*H04B 7/02* (2006.01)
(Continued)

(52) U.S. Cl.
CPC ............. *H04W 52/242* (2013.01); *H04B 7/02* (2013.01); *H04B 17/318* (2015.01);
(Continued)

(58) Field of Classification Search
CPC ...... H04B 7/02; H04W 52/245; H04W 52/242
See application file for complete search history.

(56) References Cited

U.S. PATENT DOCUMENTS 6,172,644 B1 1/2001 Stilp
6,282,180 B1 8/2001 Paneth et al.
(Continued)

FOREIGN PATENT DOCUMENTS

EP 0682419 A2 11/1995
EP 1395078 A2 3/2004
(Continued)

OTHER PUBLICATIONS

International Search Report and Written Opinion; European Patent Office; International Application No. PCT/US2014/021227; dated Sep. 12, 2014.
(Continued)

*Primary Examiner* — William Nealon
(74) *Attorney, Agent, or Firm* — Faegre Baker Daniels LLP

(57) ABSTRACT

Methods and apparatus for determining a transmit antenna gain and a spatial mode of a wireless device (100) are disclosed. The apparatus (100) includes a main receive antenna (112) associated with a first receive signal strength, a diversity receive antenna (114) associated with a second receive signal strength, and a transmit antenna (116). Each of the antennas (112, 114, and 116) is operatively coupled to a controller (102). The controller (102) determines (i) a difference between the first receive signal strength and the second receive signal strength, (ii) a correction factor based on the difference, and (iii) the transmit antenna gain based on the correction factor. In addition, the difference between the first receive signal strength and the second receive signal strength may be used, along with other sensor data (e.g., accelerometer), to estimate the spatial mode (e.g., orientation and hand grip) of the device (100). This spatial mode estimation may be then be used, among other things, to more accurately determine transmit antenna gain.

17 Claims, 16 Drawing Sheets

(51) Int. Cl.
*H04B 17/318* (2015.01)
*H04W 52/28* (2009.01)

(52) U.S. Cl.
CPC ........ *H04W 52/245* (2013.01); *H04W 52/282* (2013.01); *H04W 52/283* (2013.01)

(56) References Cited

U.S. PATENT DOCUMENTS

| | | | |
|---|---|---|---|
| 6,311,075 | B1 | 10/2001 | Bevan et al. |
| 6,347,234 | B1 | 2/2002 | Scherzer |
| 6,353,406 | B1 | 3/2002 | Lanzl et al. |
| 6,420,935 | B1 | 7/2002 | Harris et al. |
| 6,697,641 | B1 | 2/2004 | Shapira |
| 2002/0051433 | A1 | 5/2002 | Affes et al. |
| 2002/0126780 | A1 | 9/2002 | Oshima et al. |
| 2002/0164963 | A1 | 11/2002 | Tehrani et al. |
| 2003/0017832 | A1 | 1/2003 | Anderson et al. |
| 2003/0092402 | A1 | 5/2003 | Shapria et al. |
| 2003/0134648 | A1 | 7/2003 | Reed et al. |
| 2003/0162566 | A1 | 8/2003 | Shapira et al. |
| 2004/0220465 | A1 | 11/2004 | Cafarella |
| 2005/0003828 | A1 | 1/2005 | Sugar et al. |
| 2005/0075090 | A1 | 4/2005 | Bickham et al. |
| 2005/0101352 | A1 | 5/2005 | Logothetis et al. |
| 2005/0192727 | A1 | 9/2005 | Shostak et al. |
| 2005/0286466 | A1 | 12/2005 | Tagg |
| 2006/0145853 | A1 | 7/2006 | Richards et al. |
| 2007/0032241 | A1 | 2/2007 | Busch et al. |
| 2007/0046369 | A1 | 3/2007 | Schober et al. |
| 2007/0194924 | A1 | 8/2007 | Karr |
| 2007/0211786 | A1 | 9/2007 | Shattil |
| 2008/0045234 | A1 | 2/2008 | Reed |
| 2008/0080631 | A1 | 4/2008 | Forenza et al. |
| 2008/0090575 | A1 | 4/2008 | Barak et al. |
| 2008/0132281 | A1 | 6/2008 | Kim et al. |
| 2008/0139128 | A1 | 6/2008 | Liao |
| 2008/0144493 | A1 | 6/2008 | Yeh |
| 2008/0219376 | A1 | 9/2008 | Qi et al. |
| 2009/0102740 | A1 | 4/2009 | Rofougaran |
| 2009/0170444 | A1 | 7/2009 | Retnasothie et al. |
| 2009/0196274 | A1 | 8/2009 | Rimini et al. |
| 2009/0316904 | A1 | 12/2009 | Klingenbrunn et al. |
| 2010/0087151 | A1 | 4/2010 | Auer |
| 2010/0099363 | A1 | 4/2010 | Faust et al. |
| 2010/0109445 | A1 | 5/2010 | Kurs et al. |
| 2010/0317297 | A1 | 12/2010 | Kratochwil et al. |
| 2011/0135308 | A1 | 6/2011 | Tarlazzi et al. |
| 2011/0255575 | A1 | 10/2011 | Zhu et al. |
| 2011/0269490 | A1 | 11/2011 | Earnshaw et al. |
| 2011/0273334 | A1 | 11/2011 | Karr |
| 2012/0014415 | A1 | 1/2012 | Su et al. |
| 2012/0020392 | A1 | 1/2012 | O'Keeffe et al. |
| 2012/0027066 | A1 | 2/2012 | O'Keeffe |
| 2012/0039280 | A1 | 2/2012 | Chen et al. |
| 2012/0064825 | A1 | 3/2012 | Landon et al. |
| 2012/0076077 | A1 | 3/2012 | Buckley et al. |
| 2012/0202560 | A1* | 8/2012 | Donaldson .......... H04M 1/6066 455/552.1 |
| 2013/0035051 | A1* | 2/2013 | Mujtaba ............... H04B 7/0808 455/277.2 |
| 2013/0217450 | A1* | 8/2013 | Kanj ...................... H01Q 1/242 455/575.7 |
| 2015/0071335 | A1* | 3/2015 | Breslin ............... H04W 52/245 375/227 |

FOREIGN PATENT DOCUMENTS

| | | |
|---|---|---|
| EP | 2083472 A1 | 7/2009 |
| EP | 2378669 A1 | 10/2011 |
| WO | 0156204 A1 | 8/2001 |
| WO | 0209363 A2 | 1/2002 |
| WO | 2005011128 A1 | 2/2005 |
| WO | 2008086231 A2 | 7/2008 |
| WO | 2012040640 A1 | 3/2012 |
| WO | 2012/067720 A1 | 5/2012 |
| WO | 2012075137 A1 | 6/2012 |

OTHER PUBLICATIONS

Tomatta, Paul: "Overcoming the LTE handset antenna design problem",. EE TIMES-ASIA, eetasia.com, Aug. 13, 2009, all pages.

* cited by examiner

METHODS AND APPARATUS FOR DETERMINING A TRANSMIT ANTENNA GAIN AND A SPATIAL MODE OF A DEVICE

The present disclosure relates in general to wireless devices, and, in particular, to methods and apparatus for determining a transmit antenna gain and a spatial mode of a wireless device.

BACKGROUND OF THE INVENTION

Wireless devices typically adjust the amount of power they deliver to the transmit antenna of the wireless device. For example, when a cellular phone is close to a base station, less power is required than when the cellular phone is farther away from the base station. In this example, the base station may dynamically instruct the cellular phone to go to a certain transmit power level based on the signal strength being received by the base station.

However, circumstances local to the cellular phone may change since the last base station instruction. For example, the user may change his/her grip on the cellular phone and thereby create path loss due to shading that affects the signal. In order to compensate for this type of situation, the cellular phone may also make adjustments to its transmit power level. However, without information from the base station, the cellular phone cannot measure its transmit path loss. Instead, the cellular phone may measure its receive signal strength to estimate its transmit path loss and adjust its transmit power accordingly.

If the receive antenna in the handset is physically located near the transmit antenna, this estimation technique works well. However, if the receive antenna in the handset is not physically located near the transmit antenna, this estimation may be inaccurate. An improved method of estimating the spatial mode (e.g., orientation and hand grip) of wireless devices is needed. This improved estimation of spatial mode may be used, among other things, to more accurately determine transmit antenna gain.

DETAILED DESCRIPTION OF THE PREFERRED EMBODIMENTS

Briefly, methods and apparatus for determining a transmit antenna gain and a spatial mode of a wireless device are disclosed. In an embodiment, the apparatus includes a main receive antenna associated with a first receive signal strength, a diversity receive antenna associated with a second receive signal strength, and a transmit antenna. Each of the antennas is operatively coupled to a controller. The controller determines (i) a difference between the first receive signal strength and the second receive signal strength, (ii) a correction factor based on the difference, and (iii) the transmit antenna gain based on the correction factor. In addition, the difference between the first receive signal strength and the second receive signal strength may be used, along with other sensor data (e.g., accelerometer), to estimate the spatial mode (e.g., orientation and hand grip) of the device. This spatial mode estimation may then be used, among other things, to more accurately determine transmit antenna gain.

Determining the difference between the at least two receive signal strengths may include measuring an antenna signal strength for each of the various receive antenna paths. The diversity receive antenna may be physically located between the main receive antenna and a transmit antenna. Determining the difference between the at least two different receive signal strengths may be performed in real time. Determining the correction factor may include determining if the difference between the at least two receive signal strengths exceeds a predetermined threshold. This predetermined threshold may be indicative of an adjusted gain difference between a main receive antenna and a diversity receive antenna. Determining the correction factor may include determining an indication of path loss.

In another embodiment, the apparatus includes a proximity sensor structured to produce proximity data, an accelerometer structured to produce accelerometer data, a main receive antenna associated with a first receive signal strength, a diversity receive antenna associated with a second receive signal strength, and a transmit antenna. Each of the devices is operatively coupled to a controller. The controller determines (i) a difference between the first receive signal strength and the second receive signal strength, and (ii) the spatial mode of the wireless device based on the proximity data, the accelerometer data, and the difference between the first receive signal strength and the second receive signal strength.

In one example, the diversity receive antenna is physically located between the main receive antenna and the transmit antenna. In one example, the controller is structured to determine a transmit antenna gain based on the spatial mode of the wireless device.

Figure 1:
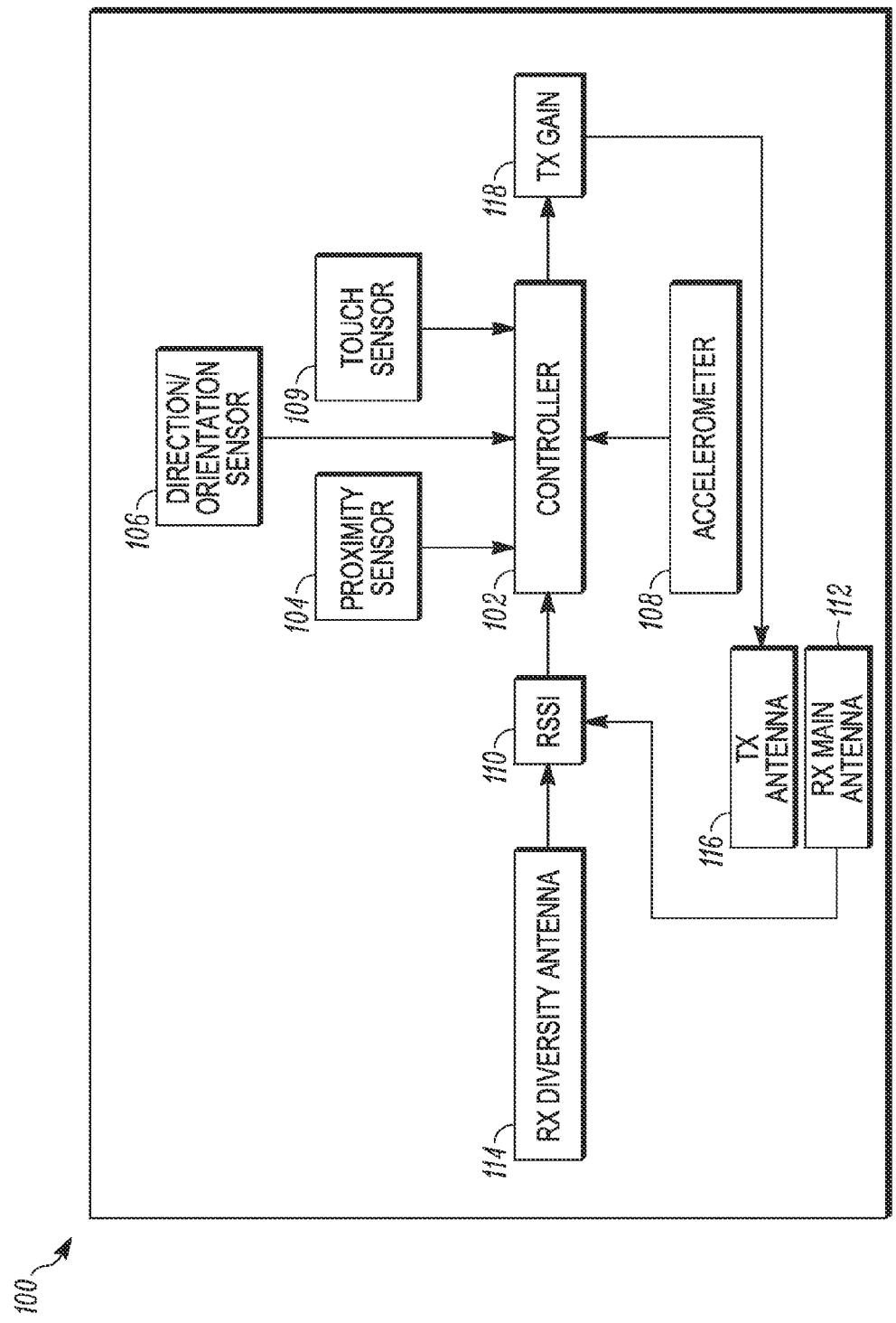
FIG. 1 is a block diagram of an example wireless device with a main receive antenna physically located near a transmit antenna.

Turning now to the figures, a block diagram of an example wireless device 100 with a main receive antenna 112 physically located near a transmit antenna 116 is illustrated in FIG. 1. In this example, the wireless device 100 includes a controller 102 operatively coupled to a proximity sensor 104, a direction/orientation sensor 106 such as a gyroscope, accelerometer 108, and a touch sensor 109 (e.g., a capacitive touch sensor). The proximity sensor 104 may be a light sensor. The proximity sensor 104 detects when the user or another object is near the wireless device 100. The direction/orientation sensor 106 measures the rate of rotation of the electronic device 100 around an axis. The accelerometer 108 measures the orientation of the wireless device 100 relative to the surface of the earth. It will be appreciated that any suitable sensors may be used. For example, a magnetometer and or global positioning system (GPS) device may be used as an input to the controller 102.

The example wireless device 100 also includes a receive signal strength indicator (RSSI) 110. The receive signal strength indicator 110 is operatively coupled to a main receive antenna 112 and a diversity receive antenna 114. The receive signal strength indicator 110 supplies the controller 102 with data indicative of the signal strength of each of the antennas 112, 114, 116. In this example, the main receive antenna 112 is located near the transmit antenna 116, and the diversity receive antenna 114 is located away from the main receive antenna 112 and the transmit antenna 116. As a result, the signal strength of the main receive antenna 112 may be a relatively good indicator of the gain needed for the transmit antenna 116.

As described in detail below, the controller 102 determines the amount of transmit antenna gain 118. For example, the controller 102 uses the data from the proximity sensor 104, the direction/orientation sensor 106, the accelerometer 108, and/or any other suitable sensors to determine the amount of transmit antenna gain 118.

Figure 2:
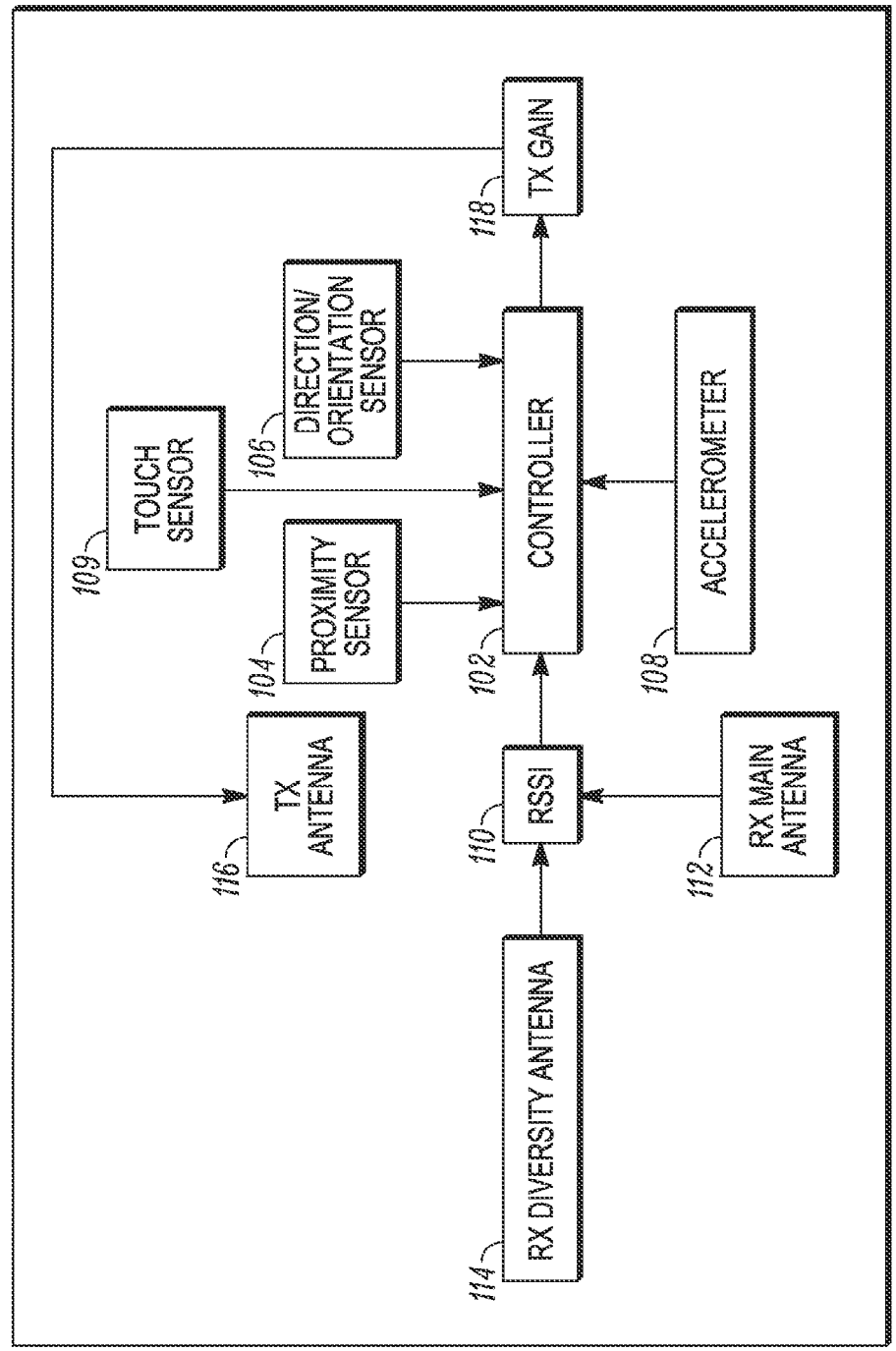
FIG. 2 is a block diagram of an example wireless device with a diversity receive antenna physically located between a main receive antenna and a transmit antenna.

A block diagram of an example wireless device with a diversity receive antenna physically located between a main receive antenna and a transmit antenna is illustrated in FIG. 2. In this example, the wireless device 100 includes a controller 102 operatively coupled to a proximity sensor 104, a direction/orientation sensor 106, and accelerometer 108. The proximity sensor 104 may be a light sensor. The proximity sensor 104 detects when the user or another object is near the wireless device 100. The direction/orientation sensor 106 measures the rate of rotation of the electronic device 100 around an axis. The accelerometer 108 measures the orientation of the wireless device 100 relative to the surface of the earth. It will be appreciated that any suitable sensors may be used. For example, a magnetometer and or global positioning system (GPS) device may be used as an input to the controller 102.

The example wireless device 100 also includes a receive signal strength indicator (RSSI) 110. The receive signal strength indicator 110 is operatively coupled to a main receive antenna 112 and a diversity receive antenna 114. The receive signal strength indicator 110 supplies the controller 102 with data indicative of the signal strength of each of the antennas 112, 114, 116. In this example, the main receive antenna 112 is not located near the transmit antenna 116, and the diversity receive antenna 114 is between the main receive antenna 112 and the transmit antenna 116. As a result, the signal strength of the main receive antenna 112 may not be a good indicator of the gain needed for the transmit antenna 116 without a correction factor.

The controller 102 determines the amount of transmit antenna gain 118. For example, the controller 102 may determine a difference between the received signal strength indicator values for the main receive antenna 112 and the diversity receive antenna 114. This difference may then be used to determine a correction factor, which is a function of the difference between the two receive signal strengths (e.g., the difference between the two receive signal strengths minus some predetermined constant). The correction factor may then be used by the controller 102 to determine the appropriate amount of transmit antenna gain 118. In addition, the controller 102 may use the data from the proximity sensor 104, the direction/orientation sensor 106, the accelerometer 108, and/or any other suitable sensors to determine the amount of transmit antenna gain 118.

Figure 3:
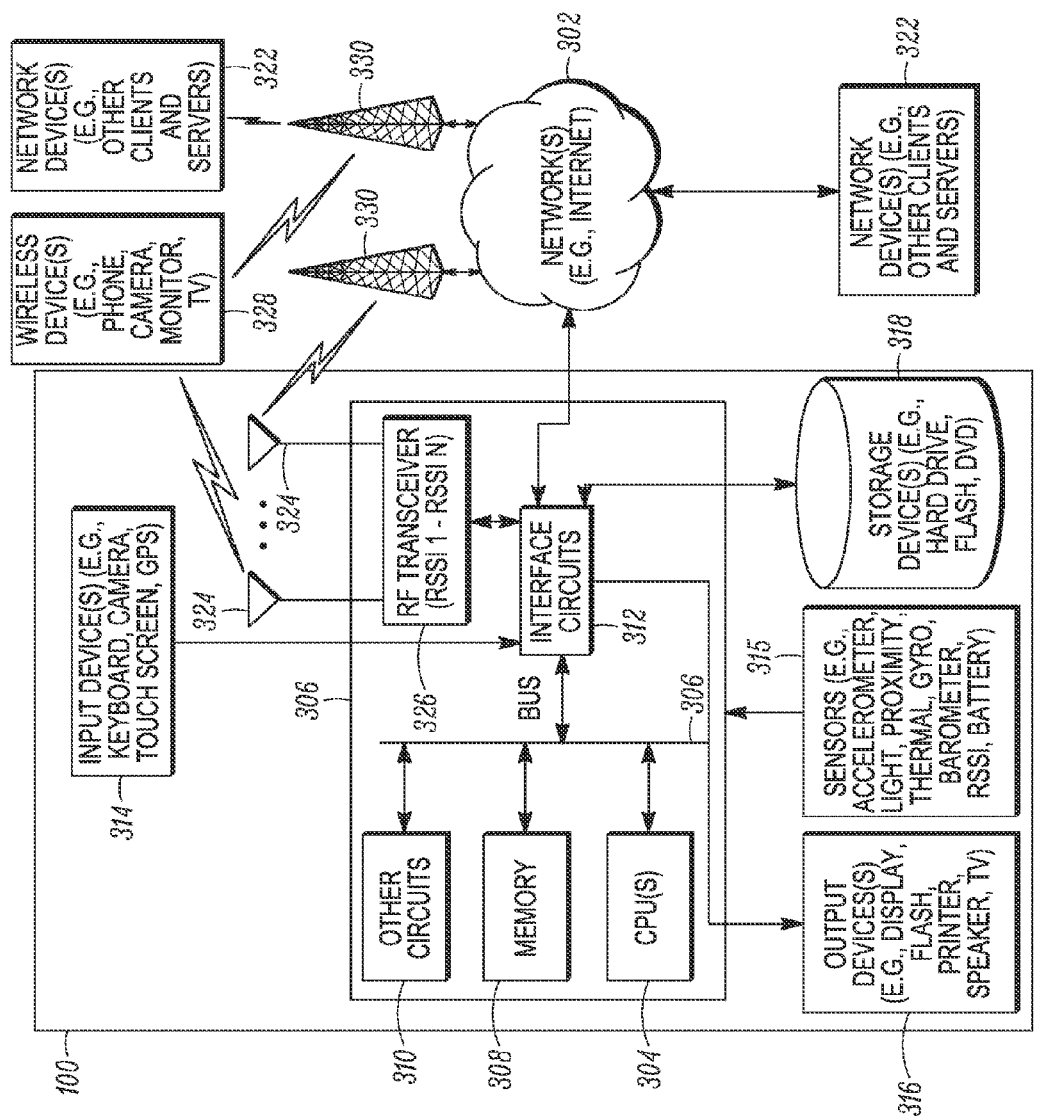
FIG. 3 is a block diagram of another example wireless device.

The wireless device 100 illustrated in FIG. 1 and FIG. 2 may include certain common aspects of many electronic devices such as microprocessors, memories, peripherals, etc. A block diagram of certain elements of an example wireless device 100 is illustrated in FIG. 3. The example wireless device 100 includes a main unit 306 which may include, if desired, one or more physical processors 304 electrically coupled by an address/data bus 306 to one or more memories 308, other computer circuitry 310, and one or more interface circuits 312. The processor 304 may be any suitable processor or plurality of processors. For example, the wireless device 100 may include a central processing unit (CPU) and/or a graphics processing unit (GPU).

The memory 308 may include various types of non-transitory memory including volatile memory and/or non-volatile memory such as, but not limited to, distributed memory, read-only memory (ROM), random access memory (RAM) etc. The memory 308 typically stores a software program that interacts with the other devices in the system as described herein. This program may be executed by the processor 304 in any suitable manner. The memory 308 may also store digital data indicative of documents, files, programs, web pages, etc. retrieved from a server and/or loaded via an input device 314.

The interface circuit 312 may be implemented using any suitable interface standard, such as an Ethernet interface and/or a Universal Serial Bus (USB) interface. One or more input devices 314 and/or sensors 315 may be connected to the interface circuit 312 for entering data and commands into the main unit 106. For example, the input device 314 may be a keyboard, mouse, touch screen, track pad, isopoint, camera, voice recognition system and/or any other suitable input device 314. Example sensors 315 include a proximity sensor, a light sensor, a direction/orientation sensor (e.g., a gyroscope), an accelerometer, a global positioning system (GPS), and/or any other suitable sensor 315.

One or more displays, printers, speakers, monitors, televisions, high definition televisions, and/or other suitable output devices 316 may also be connected to the main unit 106 via the interface circuit 312. The display 316 may be a liquid crystal displays (LCDs), electronic ink (e-ink), and/or any other suitable type of display. The display 316 generates visual displays of data generated during operation of the device 300. For example, the display 316 may be used to display web pages and/or other content received from a server 106 and other device. The visual displays may include prompts for human input, run time statistics, calculated values, data, etc.

One or more storage devices 318 may also be connected to the main unit 106 via the interface circuit 312. For example, a hard drive, CD drive, DVD drive, and/or other storage devices may be connected to the main unit 106. The storage devices 318 may store any type of data used by the device 300.

The wireless device 100 may also exchange data with other network devices 322 via a connection to a network 302. The network connection may be any type of network connection, such as an Ethernet connection, digital subscriber line (DSL), telephone line, coaxial cable, wireless base station 330, etc. Users of the system 100 may be required to register with a server 106. In such an instance, each user may choose a user identifier (e.g., e-mail address) and a password which may be required for the activation of services. The user identifier and password may be passed across the network 302 using encryption built into the user's browser. Alternatively, the user identifier and/or password may be assigned by the server 106.

Wireless device 100 includes one or more antennas 324 connected to one or more radio frequency (RF) transceivers 326. The transceiver 326 may include one or more receivers and one or more transmitters operating on the same and/or different frequencies. For example, the device 300 may include a Bluetooth transceiver, a Wi-Fi transceiver, and/or diversity cellular transceivers. The transceiver 326 allows the device 300 to exchange signals, such as voice, video and data, with other wireless devices 328, such as a phone, camera, monitor, television, and/or high definition television. For example, the device 300 may send and receive wireless telephone signals, text messages, audio signals and/or video signals directly and/or via a base station 330. A receive signal strength indicator (RSSI) associated with each receiver generates an indication of the relative strength or weakness of each signal being received by the device 300.

Figure 4:
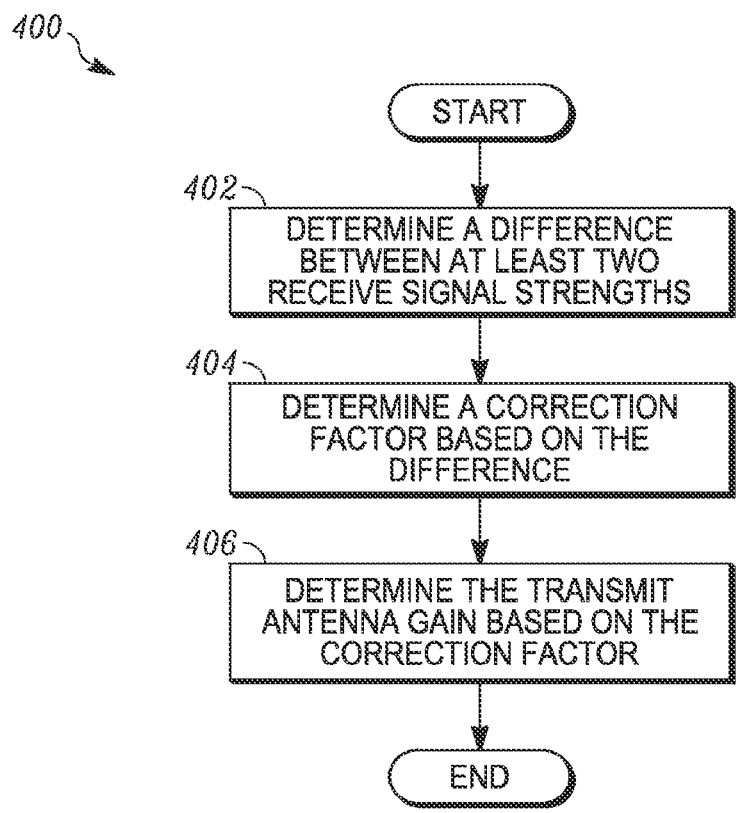
FIG. 4 is a flowchart of an example process for determining a transmit antenna gain.

A flowchart of an example process 400 for determining a transmit antenna gain is illustrated in FIG. 4. The process 400 may be carried out by one or more suitably programmed processors, such as a CPU executing software (e.g., block 304 of FIG. 3). The process 400 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 400 is described with reference to the flowchart illustrated in FIG. 4, it will be appreciated that many other methods of performing the acts associated with process 400 may be used. For example, the order of many of the operations may be changed, and some of the operations described may be optional.

In this example, the process 400 begins when the controller 102 determines a difference between at least two receive signal strengths (block 402). For example, the controller 102 may subtract the signal strength of the main receive antenna 112 from the signal strength of the diversity receive antenna 114. The controller 102 then determines a correction factor based on the difference (block 404). For example, the controller 102 may set the correction factor equal to the difference between the two receive signal strengths minus some predetermined threshold. The controller 102 then determines the transmit antenna gain based on the correction factor (block 406). For example, the transmit path loss may be estimated based on the correction factor and used to determine the transmit antenna gain. In addition, for duplex antennas, the transmit antenna may be reassigned. For example, the receive antenna with the highest RSSI may become the primary transmit antenna if the transmit and receive frequency bands are the same (e.g., time-division duplexed systems).

Figure 5:
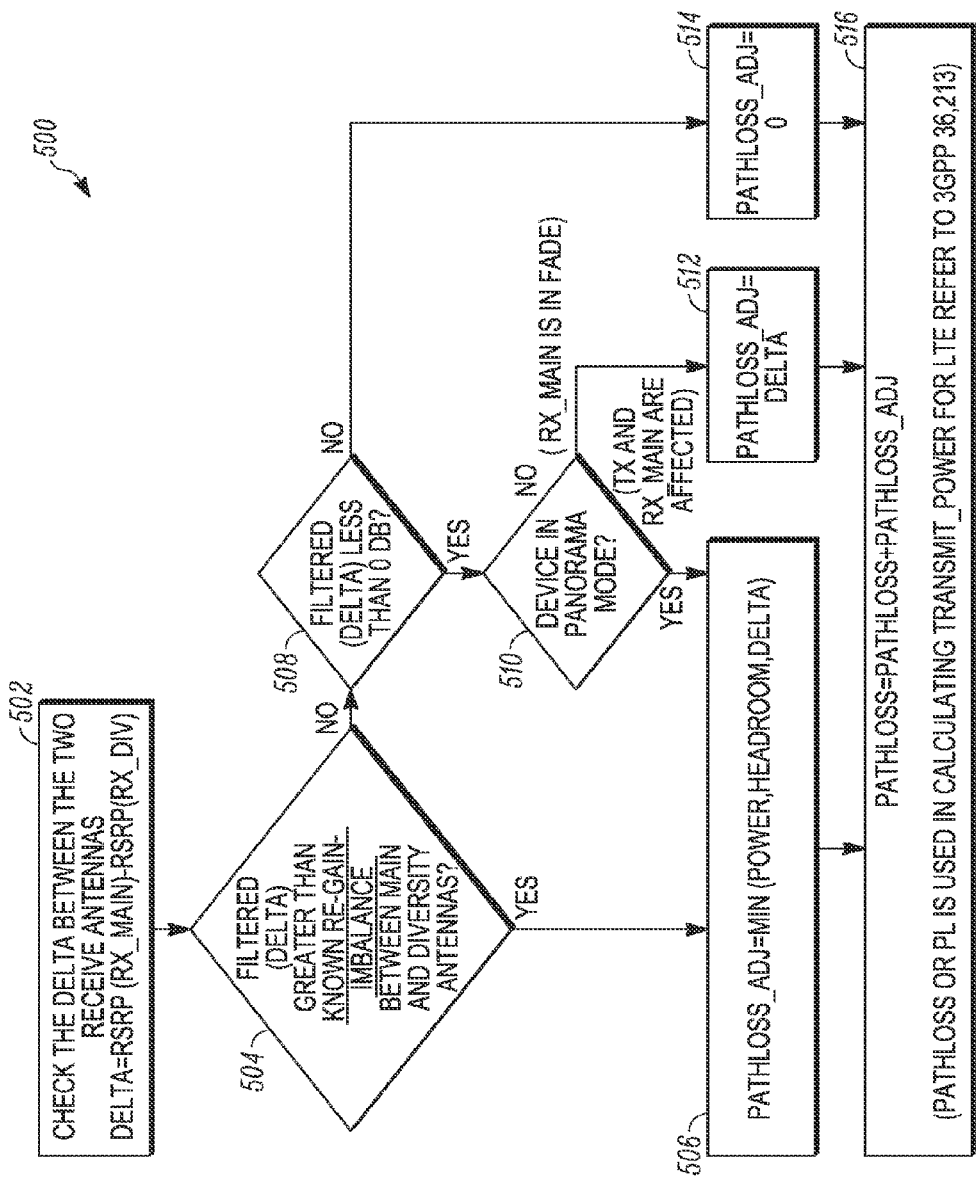
FIG. 5 is a flowchart of another example process for determining a transmit antenna gain.

A flowchart of another example process 500 for determining a transmit antenna gain is illustrated in FIG. 5. The process 500 may be carried out by one or more suitably programmed processors, such as a CPU executing software (e.g., block 304 of FIG. 3). The process 500 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 500 is described with reference to the flowchart illustrated in FIG. 5, it will be appreciated that many other methods of performing the acts associated with process 500 may be used. For example, the order of many of the operations may be changed, and some of the operations described may be optional.

In this example, the process 500 begins when the controller 102 computes the reference signal receive power (RSRP) delta (block 502). The RSRP delta is calculated by subtracting the RSRP of one antenna of a wireless device from the RSRP of another antenna of the wireless device. For example, the RSRP of the main receive antenna 122 may be +8 dBm, and the RSRP of the diversity receive antenna 114 may be +2 dBm, for a delta of +6 dBm.

If the RSRP delta is above a first threshold (e.g., greater than a known RF gain imbalance) (block 504), the controller 102 may estimate a transmit path loss adjustment to be the lower of the power headroom and the RSRP delta (block 506). For example, if the first threshold is 6 dB and the RSRP delta is 7 dB, then the transmit path loss adjustment may be set to 1 dB. Similarly, if the first threshold is 6 dB and the RSRP delta is 8 dB, then the transmit path loss adjustment may be set to 2 dB, and if the first threshold is 6 dB and the RSRP delta is 9 dB, then the transmit path loss adjustment may be set to 3 dB.

If the RSRP delta is not above the first threshold (block 504), the controller 102 may determine if the RSRP delta is below a second threshold (e.g., 0 dB) (block 508). If the RSRP delta is below the second threshold (block 508), the controller 102 may determine if the device is in panorama mode (block 510). If the device is in panorama mode (block 510), the controller 102 may estimate the transmit path loss adjustment to be the lower of the power headroom and the RSRP delta (block 506). If the device is not in panorama mode (block 510), the controller 102 may estimate the transmit path loss adjustment to be the absolute value of the RSRP delta (block 512). For example, if the second threshold is 0 dB and RSRP delta is −1 dB, then the transmit path loss adjustment may be set to 1 dB. Similarly, if the second threshold is 0 dB and the RSRP delta is −2 dB, then the transmit path loss adjustment may be set to 2 dB. If RSRP delta is not above the first threshold (block 504), and the RSRP delta is not below the second threshold (block 508), the controller 102 may set the transmit path loss adjustment to 0 dB (block 514).

Once the transmit path loss adjustment is determined, the controller 102 calculates the new path loss by adding the path loss adjustment to the current path loss (block 516). The controller 102 may then determine the transmit power using the new path loss in a well-known manner (block 516). For example, the transmit power may be determined according to the 3GPP 36213 standard.

Figure 6:
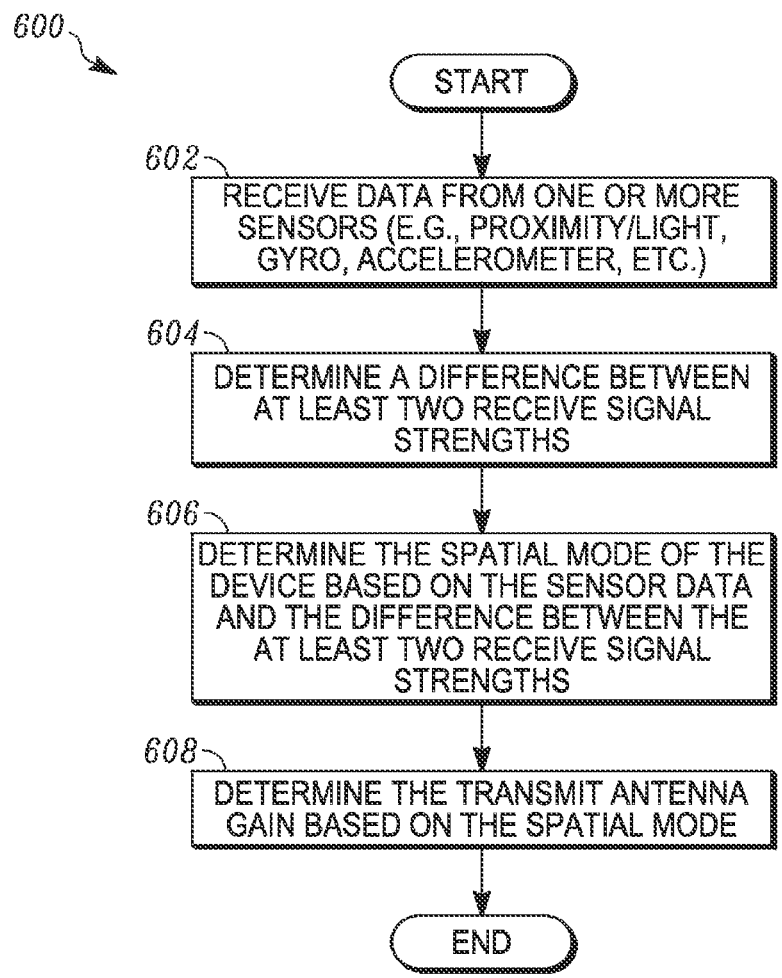
FIG. 6 is a flowchart of an example process for determining a spatial mode of a wireless device.

A flowchart of an example process 600 for determining a spatial mode of a wireless device is illustrated in FIG. 6. The process 600 may be carried out by one or more suitably programmed processors, such as a CPU executing software (e.g., block 304 of FIG. 3). The process 600 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 600 is described with reference to the flowchart illustrated in FIG. 6, it will be appreciated that many other methods of performing the acts associated with process 600 may be used. For example, the order of many of the operations may be changed, and some of the operations described may be optional.

In this example, the process 600 begins when the controller 102 receives data from one or more sensors (block 602). For example, the controller 102 receives data from the proximity/light sensor 104, the direction/orientation sensor 106, the accelerometer 108, and/or any other suitable sensors. The controller 102 then determines a difference between at least two receive signal strengths (block 604). For example, the controller 102 may subtract the signal strength of the main receive antenna 112 from the signal strength of the diversity receive antenna 114. The controller 102 then determines the spatial mode of the wireless device 100 (e.g., landscape grip, call grip, etc.) based on the sensor data and the difference between the at least two receive signal strengths (block 606). For example, the controller 102 may determine that the wireless device 100 is in a right hand grip (as described in detail below). The controller 102 then determines the transmit antenna gain based on the spatial mode of the device (block 608). For example, if the difference between the main receive antenna 112 and the diversity receive antenna 114 is less than 6 dB, and/or the wireless device 100 is in a right hand grip, the wireless device 100 may increase the transmit antenna gain. In this manner, when the transmit antenna 116 is being shadowed by the user's hand, the transmit power may be boosted.

Figure 7:
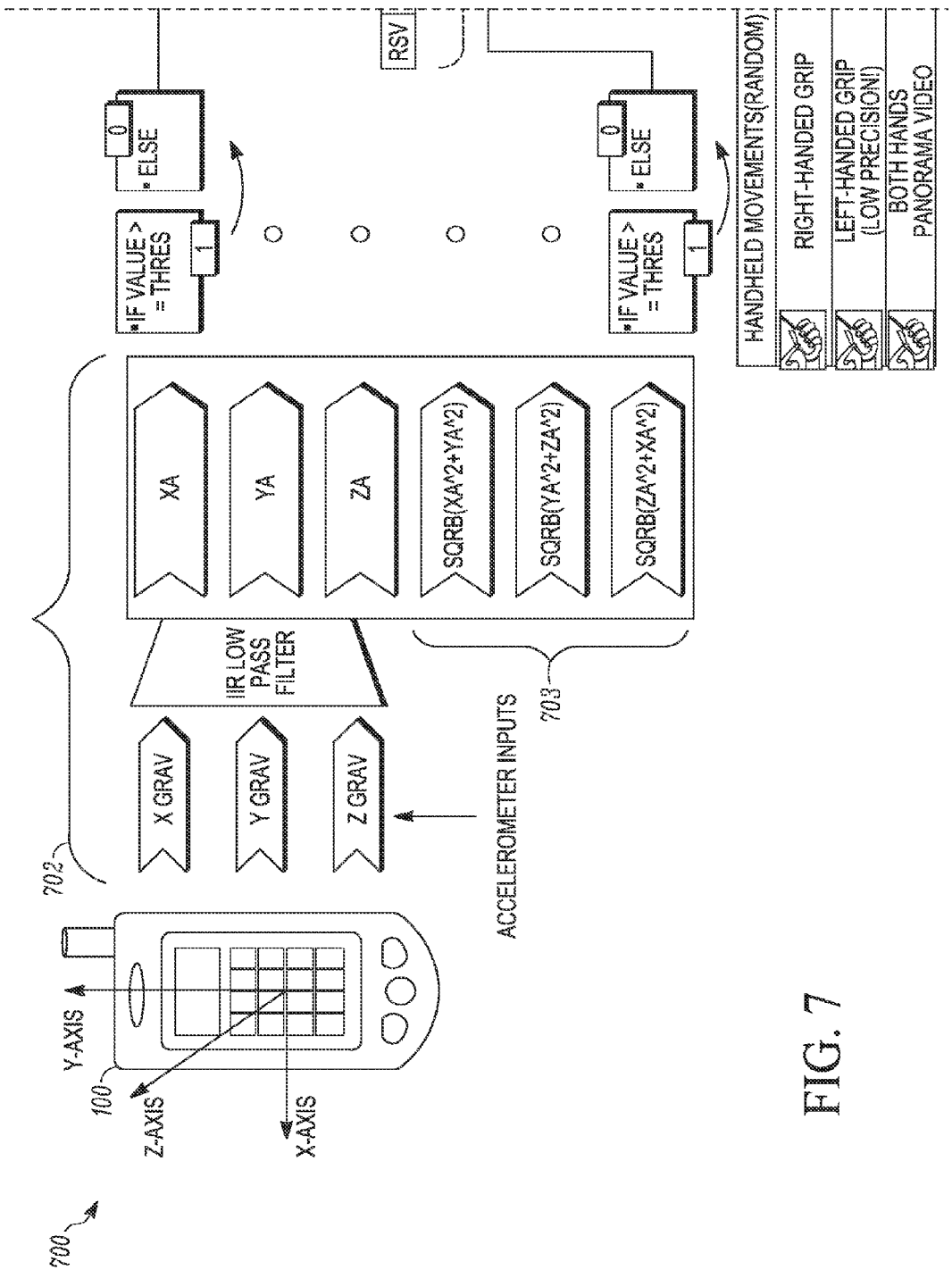
FIG. 7 and FIG. 8 illustrate a flowchart of another example process for determining a spatial mode of a wireless device.
Figure 8:
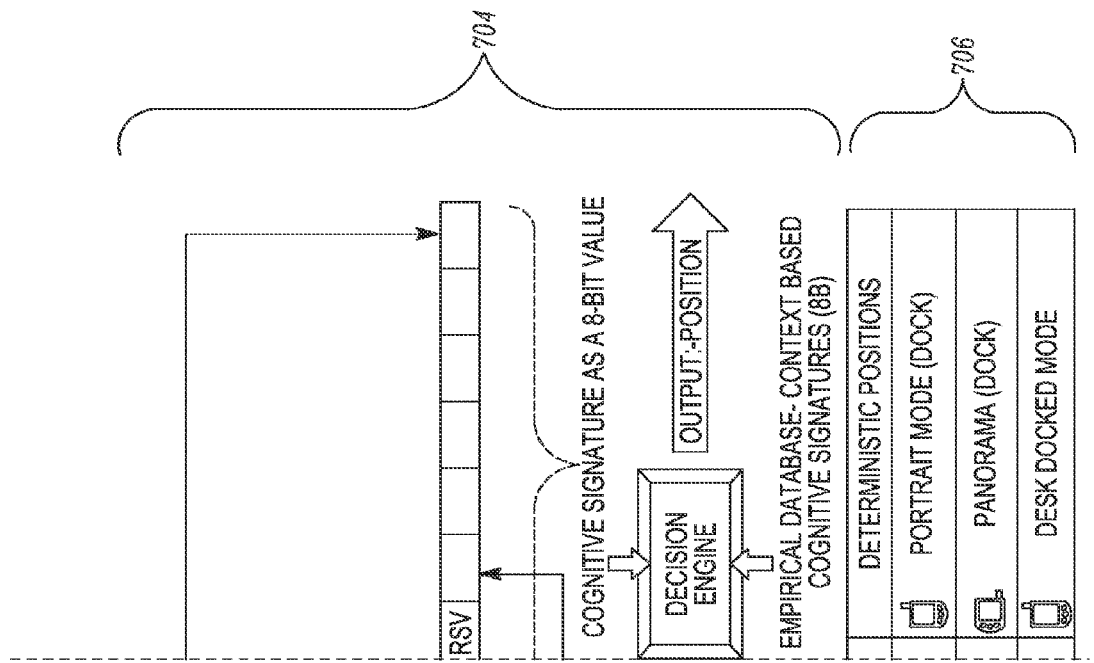

A flowchart of another example process 700 for determining a spatial mode of a wireless device is illustrated in FIG. 7 and FIG. 8. This spatial mode determination may be used in conjunction with the spatial mode determination described above with reference to FIG. 6 to determine a spatial mode of a device. The process 700 may be carried out by one or more suitably programmed processors, such as a CPU executing software (e.g., block 304 of FIG. 3). The process 700 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 700 is described with reference to the flowchart illustrated in FIG. 7 and FIG. 8, it will be appreciated that many other methods of performing the acts associated with process 700 may be used. For example, the order of many of the operations may be changed, and some of the operations described may be optional.

In this example, the process 700 begins the wireless device 100 executes a well-known detection algorithm that uses the accelerometer inputs (the gravitational velocity vector) in x, y and z directions (block 702). During this process the controller 102 checks suitably processed (e.g., low-pass IIR filtered) input vectors for x, y and z and derived values 703 (e.g., functions of input vectors for x, y and z) against a threshold, which is determined from empirical data of different spatial modes. For each input vector and derived value (six total in this example), if an input vector or derived value 703 is above the threshold, a corresponding spatial/cognitive signature bit is set to "1." If an input vector or derived value 703 is not above the threshold, the corresponding spatial signature bit is set to "0." The controller 102 then looks up the spatial signature created (8 bits in this example) in an empirical database (block 704) to estimate the position and/or grip of the wireless device 100 (block 706). The empirical database is a set of heuristic rules used to determine the sensor data signatures in various grip positions. For example, various grip position signatures may be collected by holding the device in various positions by a variety of subjects (e.g., man, woman, child) for a specified set of time.

Figure 9:
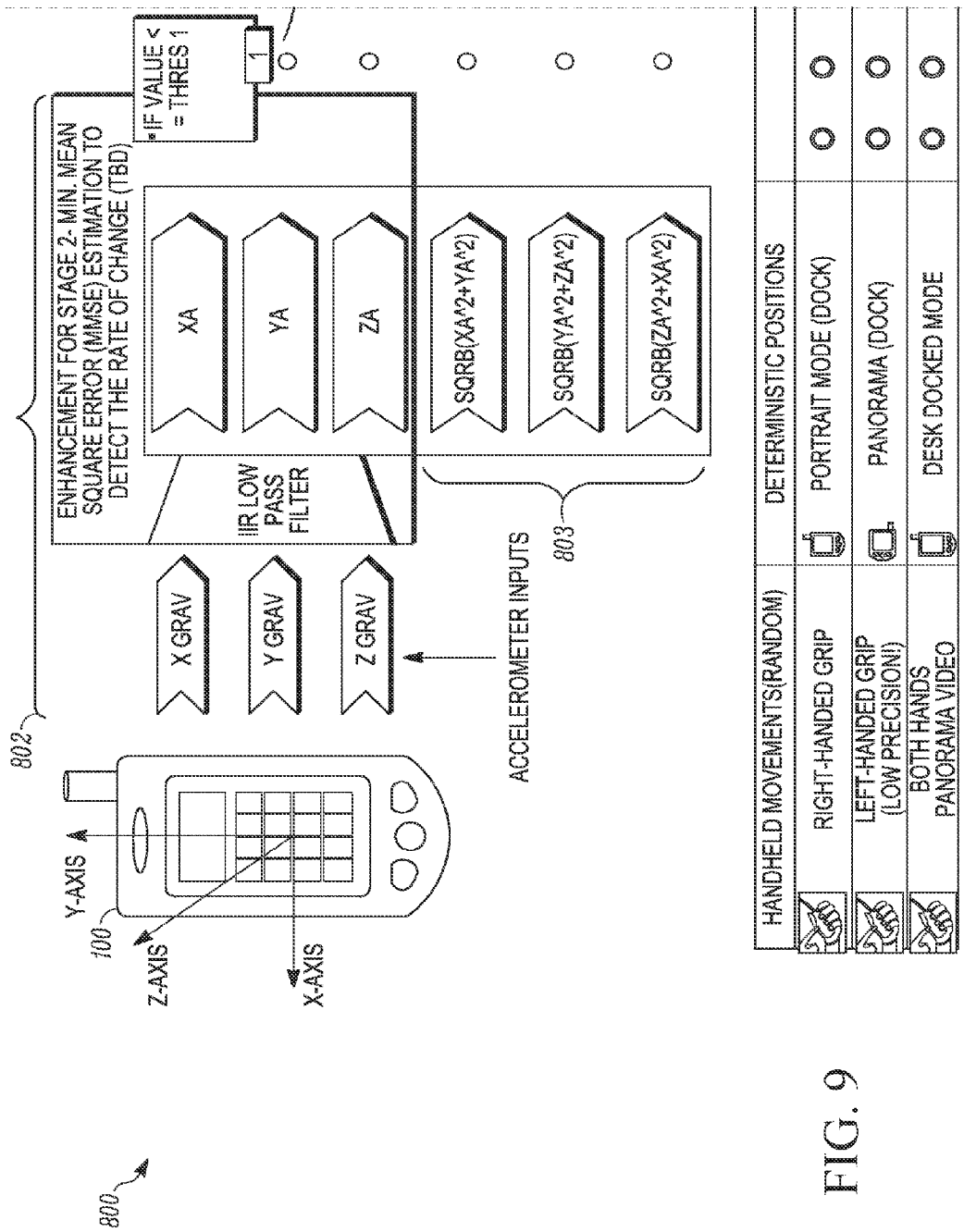
FIG. 9 and FIG. 10 illustrate a flowchart of another example process for determining a spatial mode of a wireless device.
Figure 10:
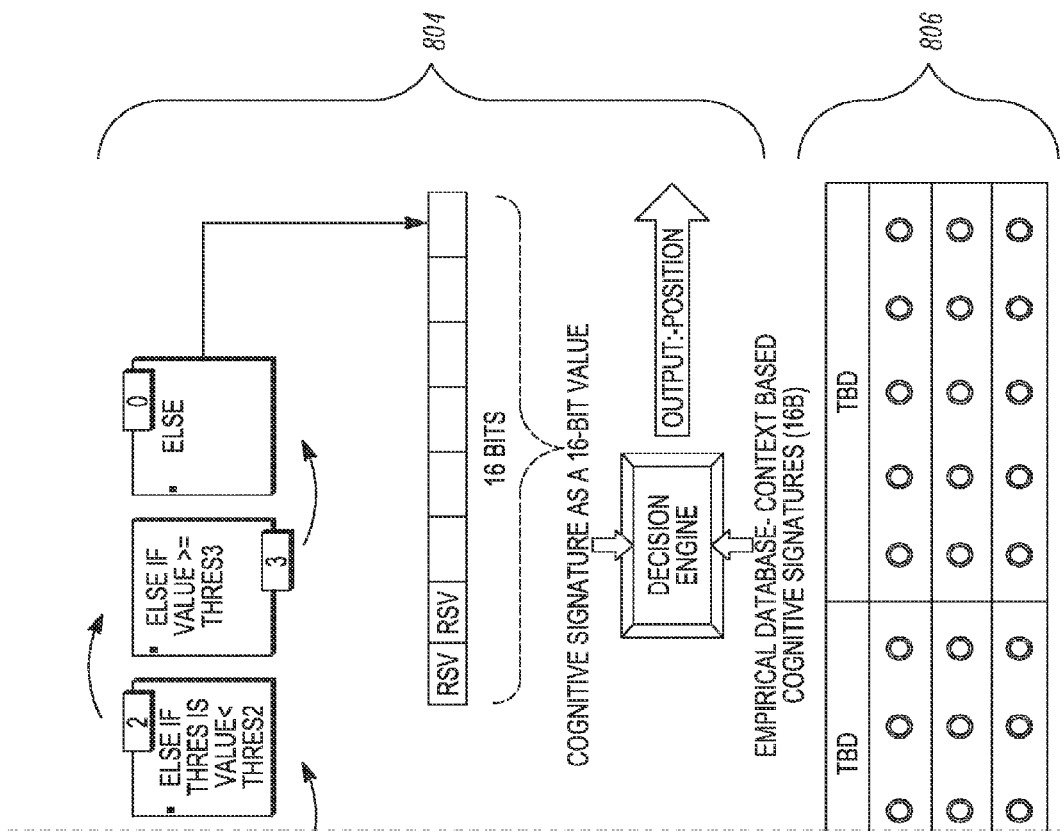

A flowchart of another example process 800 for determining a spatial mode of a wireless device is illustrated in FIG. 9 and FIG. 10. This spatial mode determination may be used in conjunction with the spatial mode determination described above with reference to FIG. 6 to determine a spatial mode of a device. The process 800 may be carried out by one or more suitably programmed processors, such as a CPU executing software (e.g., block 304 of FIG. 3). The process 800 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 800 is described with reference to the flowchart illustrated in FIG. 9 and FIG. 10, it will be appreciated that many other methods of performing the acts associated with process 800 may be used. For example, the order of many of the operations may be changed, and some of the operations described may be optional.

In this example, the process 800 begins the wireless device 100 executes a detection algorithm that uses the accelerometer inputs in x, y and z directions (block 802). During this process the controller 102 checks suitably processed (e.g., low-pass IIR filtered) input vectors for x, y and z and derived values 803 (e.g., functions of input vectors for x, y and z) against a threshold, which is determined from empirical data. In addition, the controller 102 tracks the rate of change of the accelerometer inputs with a relatively finer precision and uses a multi-level threshold for finer spatial cognizance. If an input vector or derived value 803 is less than a first threshold, corresponding spatial/cognitive signature bits are set to "01." If an input vector or derived value 703 is above the first threshold, but lower than a second threshold, the corresponding spatial signature bits are set to "10." If an input vector or derived value 703 is above a third threshold, the corresponding spatial signature bits are set to "11." Otherwise, the corresponding spatial signature bits are set to "00." The controller 102 then looks up the spatial signature created (16 bits in this example) in an empirical database to estimate the position of the wireless device 100 (block 806).

Figure 11:
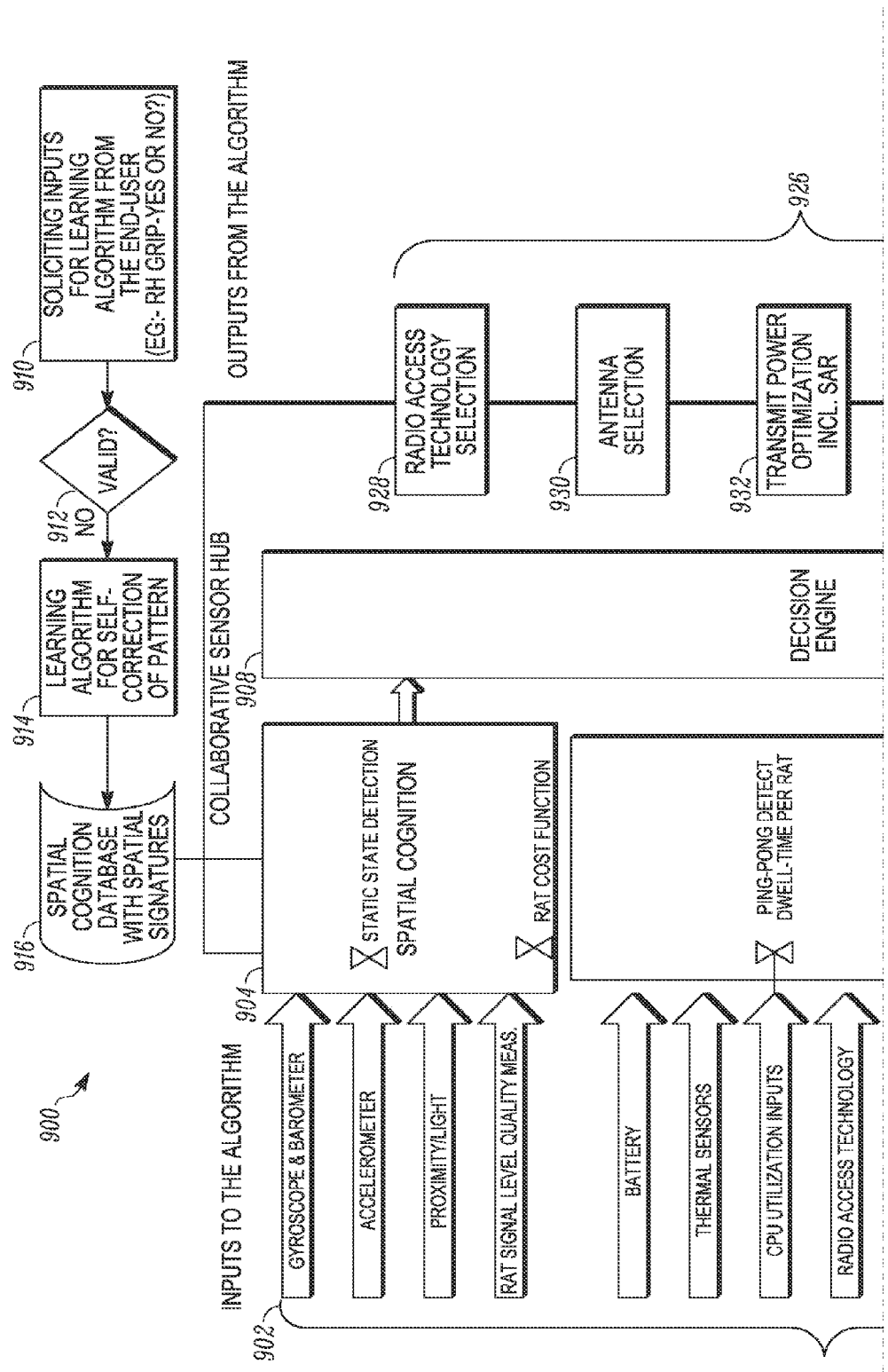
FIG. 11 and FIG. 12 illustrate a flowchart of another example process for determining a spatial mode of a wireless device.
Figure 12:
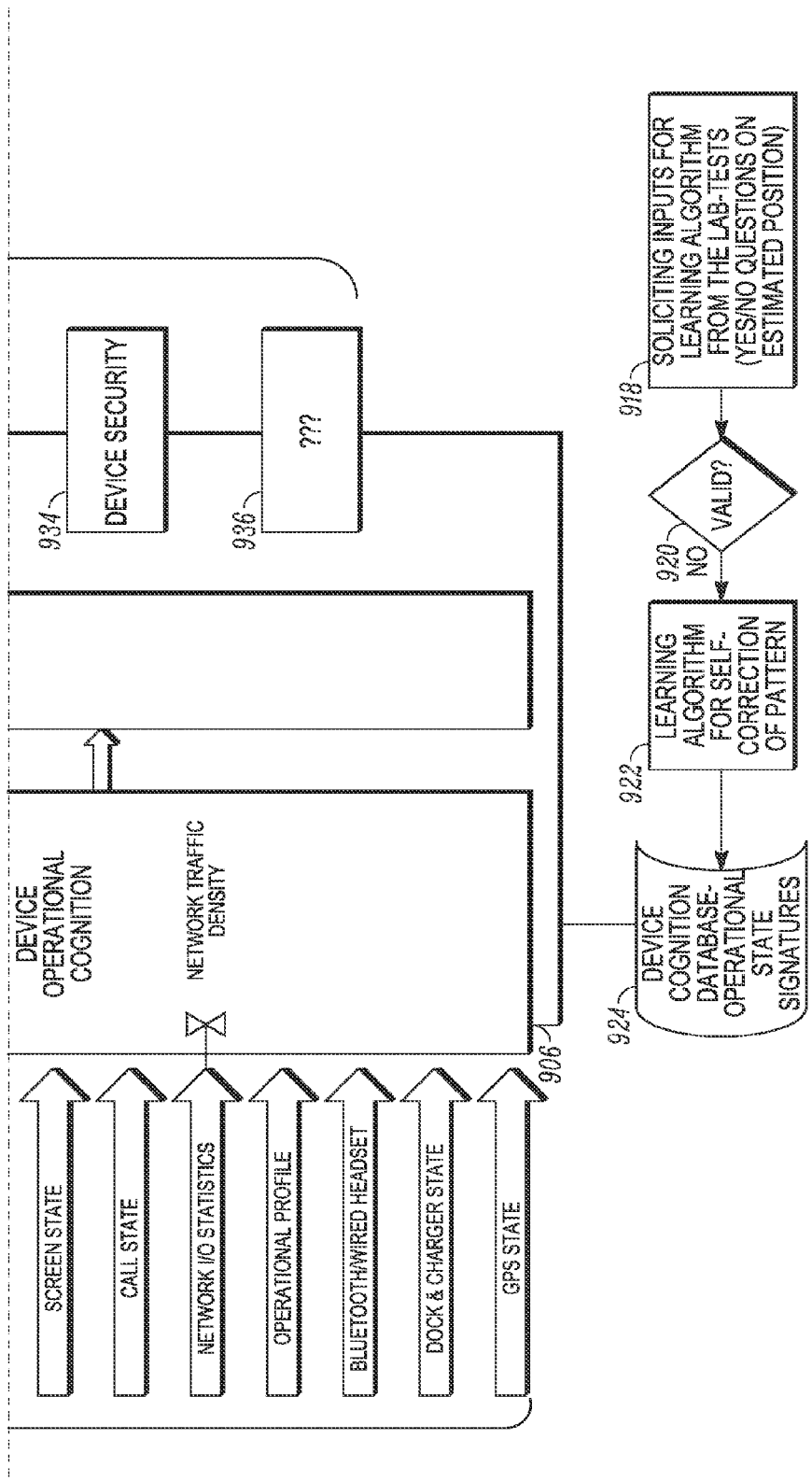

A flowchart of another example process 900 for determining a spatial mode of a wireless device is illustrated in FIG. 11 and FIG. 12. The process 900 may be carried out by one or more suitably programmed processors, such as a CPU executing software (e.g., block 304 of FIG. 3). The process 900 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 900 is described with reference to the flowchart illustrated in FIG. 11 and FIG. 12, it will be appreciated that many other methods of performing the acts associated with process 900 may be used. For example, the order of many of the operations may be changed, and some of the operations described may be optional.

In this example, the process 900 begins when a plurality of inputs 902 are processed to form a signature (e.g., 24 bits of flags). For example, the inputs 902 may come from a gyroscope, a barometer, an accelerometer, a proximity sensor, a light sensor, and or a radio access technology signal level quality measurement. One or more of these inputs may be fed into a spatial cognition detection engine 904. Other inputs may include a battery level, a thermal level, CPU utilization, a radio access technology, a screen state, a call state, network I/O statistics, an operational profile, a Bluetooth/wired headset state, a dock and charger state, and/or a GPS state. One or more of these inputs may be fed into a device operational cognition engine 906. In this example, the spatial cognition engine 904 and the device operational cognition engine 906 feed in to an overall decision engine 908.

The spatial cognition engine 904 may be improved by an auxiliary process (blocks 910-916). In this example, the improvement process includes soliciting inputs for learning algorithms from the end user (block 910). For example, the user may be periodically asked if he/she is currently holding the phone in a certain position (e.g., right hand grip). The user inputs are then validated by the algorithm (block 912) and sent to a learning algorithm (block 914) that is fed into a spatial cognition database with spatial signatures (block 916) and used to improve the spatial cognition engine 904.

Similarly, in this example, the device operational cognition engine 906 may be improved by another auxiliary process (blocks 918-924). In this example, the improvement process includes soliciting inputs for learning algorithms from lab tests (block 918). For example, a lab technician may be asked if he/she is currently holding the phone in a certain position (e.g., right hand grip). The user inputs are then validated by the algorithm (block 920) and sent to a learning algorithm (block 922) that is fed into a device cognition database with operational stats signatures (block 924) and used to improve the device operational cognition engine 906.

As described in detail below with reference to FIG. 13 and FIG. 14, the decision engine 908 uses the spatial cognition engine 904 and the device operational cognition engine 906, to produce one or more outputs 926. For example, the outputs 926 may include a radio access technology selection 928, an antenna selection 930, a transmit power optimization 932, device security 934, and/or any other suitable outputs 936.

Figure 13:
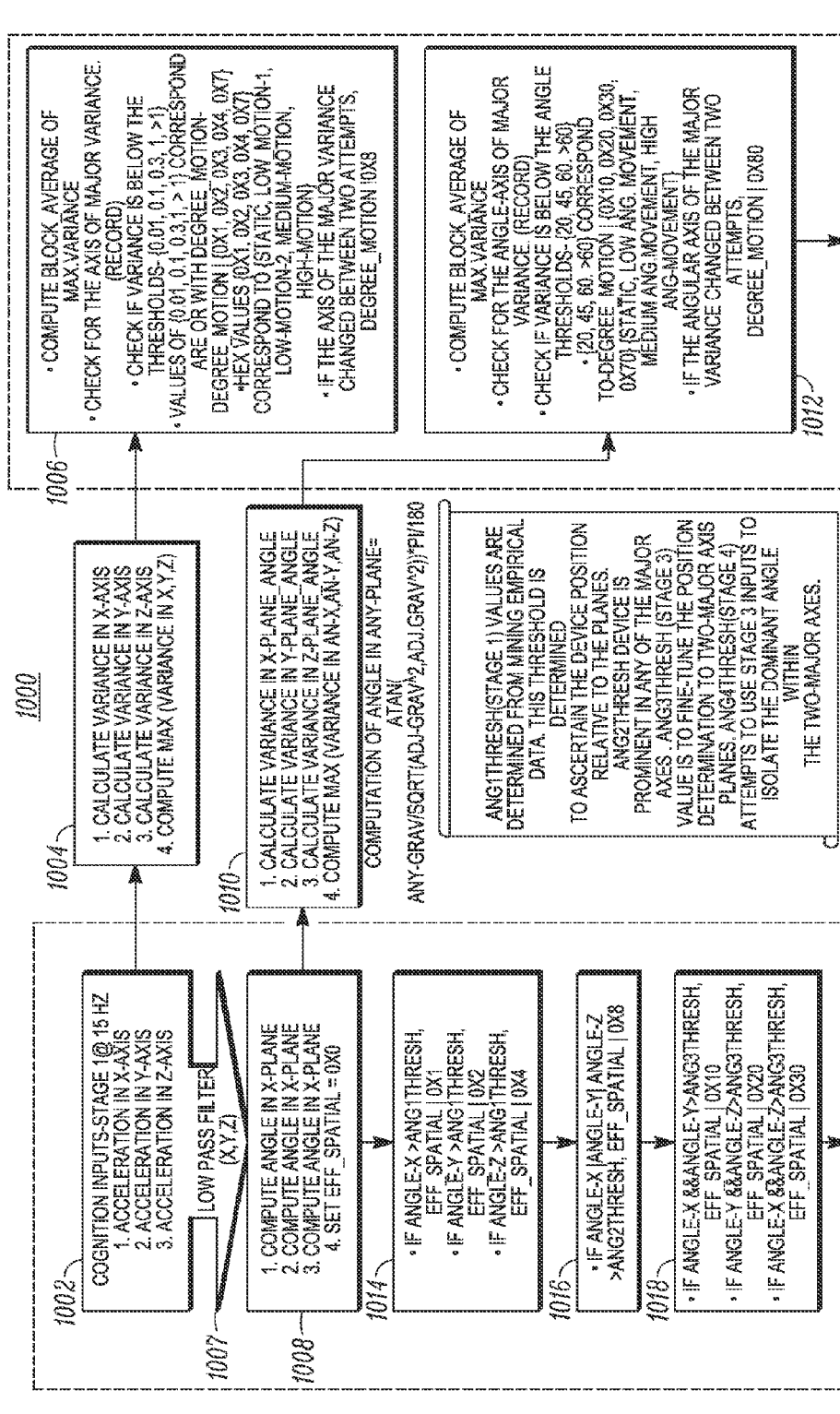
FIG. 13 and FIG. 14 illustrate a flowchart of another example process for determining a spatial mode of a wireless device.
Figure 14:
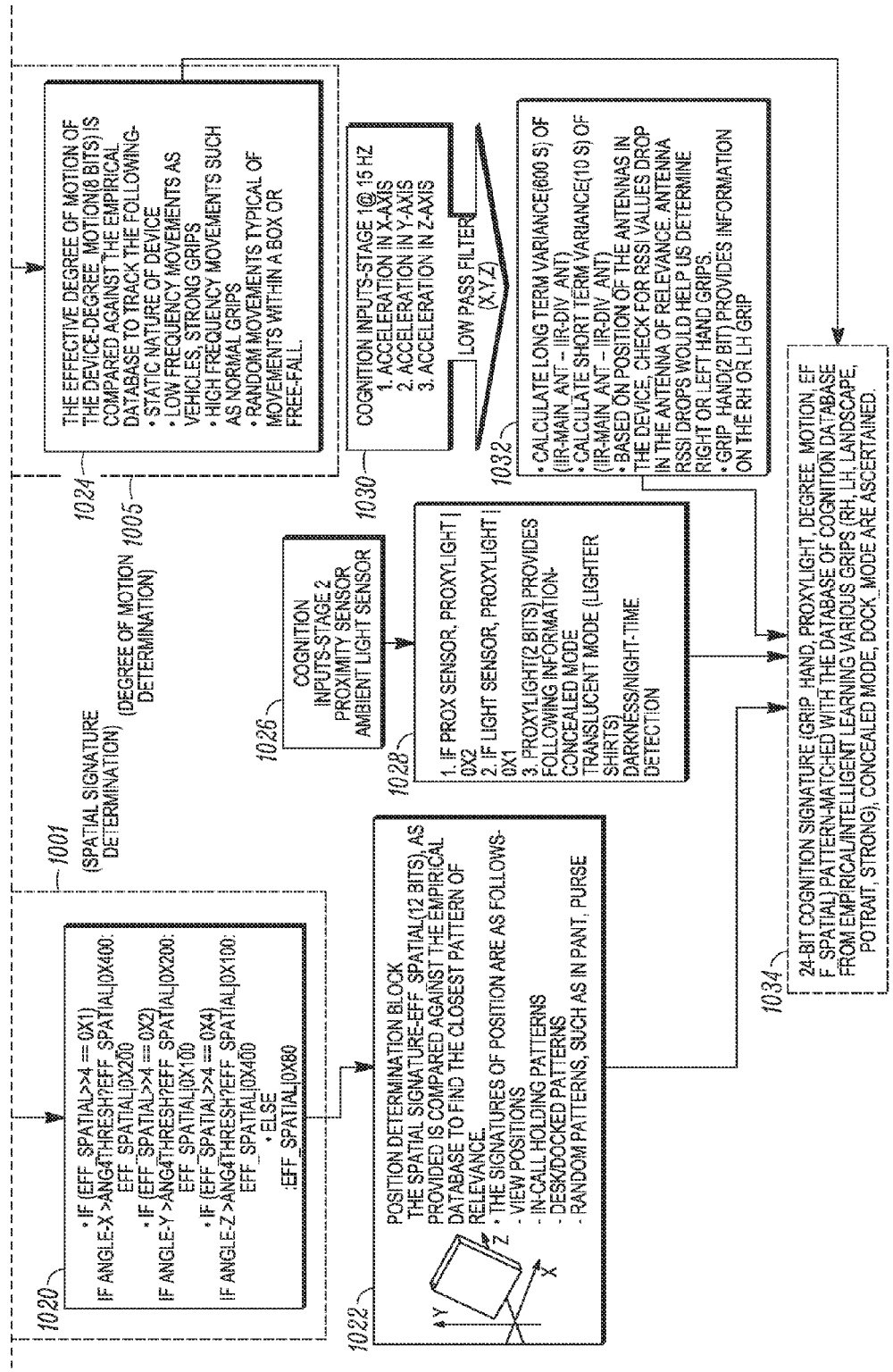

A flowchart of another example process 1000 for determining a spatial mode of a wireless device is illustrated in FIG. 13 and FIG. 14. The process 1000 may be carried out by one or more suitably programmed processors, such as a CPU executing software (e.g., block 304 of FIG. 3). The process 1000 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 1000 is described with reference to the flowchart illustrated in FIG. 13 and FIG. 14, it will be appreciated that many other methods of performing the acts associated with process 1000 may be used. For example, the order of many of the operations may be changed, and some of the operations described may be optional.

In this example the overall process 1000 begins, in a spatial signature determination sub-process 1001, when the controller 102 receives a plurality of cognition inputs from the accelerometer 108 regarding each axis of the wireless device 100 (block 1002). The accelerometer inputs 1002 are then passed through a low pass filter 1007 and used to compute certain angles associated with the wireless device 100 (block 1008). The low pass filter 1007 reduces the noise of the measurement samples.

The angles calculated (block 1008) are then compared to predetermined thresholds to set a plurality of spatial signature bits (blocks 1014-1020). These thresholds may be determined from mining empirical data. A first set of threshold comparisons is used to determine the device position relative to the planes (block 1014). For example, if the X angle is above the first threshold, a first bit of the signature is set. If the Y angle is above the first threshold, a second bit of the signature is set, and if the Z angle is above the first threshold, then a third signature bit is set. A second set of threshold comparisons is used to determine if the device is prominent in any of the major axes (block 1016). For example, if any of the three angles are above the second threshold, then a fourth bit of the signature is set. A third set of threshold comparisons is used to fine tune the position determination to two major axes planes (block 1018). In this example, if the X angle and the Y angle are above the third threshold, then a fifth bit of the signature is set. Similarly, if the Y angle and Z angle are above the third threshold, then a sixth bit of the signature is set, and if the X angle and the Z angle are above the third threshold, then a seventh bit of the signature is set. A fourth set of threshold comparisons is used to isolate the dominant angle within the two major axes (block 1020). For example, if the X angle is above the fourth threshold, an eighth bit of the signature is set. If the Y angle is above the fourth threshold, a ninth bit of the signature is set, and if the Z angle is above the fourth threshold, then a tenth signature bit is set.

Finally, after all of the calculations are completed, the position of the wireless device 100 is estimated (block 1022). This estimation is made by taking the spatial signature (e.g. 12 bits) and comparing it against an empirical database to find the closest pattern of relevance.

The accelerometer inputs from block 1002 are also used to calculate the variance on each axis and compute the maximum angle variance (block 1004). Similarly, the angles associated with the wireless device 100 from block 1008 are used to calculate the variance in each plane and compute a maximum plane variance (block 1010). These angle variance calculations are then used to by a degree of motion sub-process 1005 to perform a plurality of additional calculations (block 1006). For example, thresholds of 0.01, 0.1, 0.3 and >1 may be set based on empirical tests. In this example, if the variance exceeds 0.01, a degree motion parameter is logically-ORed with 0x01 for (0.01), 0x02 for (0.1), etc. These thresholds are dependent on the size of the wireless device 100 and are calibrated for the device 100. The degree motion parameter may be a one byte hex value. For example, a value of 0x33 may indicate a high degree of device motion, and a value of 0x11 may indicate the wireless device 100 is being held and not on a stable surface. The plane variance calculations are then used to perform a plurality of additional calculations (block 1012). For example, thresholds of 20-degrees, 45-degrees, 60-degrees and >60-degrees may be set based on empirical tests. If the variance in angle measurements exceeds 20-degrees, the degree motion parameter is logically-ORed with 0x10 for (20), 0x20 for (45), etc. These thresholds are also dependent on the size of the wireless device 100 and are calibrated for the device 100. These variances may be used to determine static conditions for a spatial mode. The variance is typically lower when the device is relatively static and higher when the device is relatively mobile. Accordingly, a normalized variance may be used to determine a confidence factor. For example, the confidence factor may be used to determine if the device is gripped (higher variance) or is in a dock (lower variance) The metrics derived from the sensor inputs of the wireless device 100 are then compared against an empirical database to track the static nature of the device 100 including low-frequency movement, such as vehicles that are not accelerating and strong grips, high-frequency movement, such as normal grips, and random movements such as movements within a shipping box or a freefall (block 1024).

As described above with reference to FIGS. 7-10, other inputs, independent of the block described above, may also be used to determine the spatial/cognition signature. For example, a proximity sensor 104 and/or ambient light sensor may be used (block 1026). In this example, if the proximity sensor 104 detects a proximity (e.g., wireless device 100 near user's ear), then a certain bit of the cognition signature is set (block 1028). Similarly, if the light sensor detects light, another bit of the cognition signature may be set. In another example, the received signal strength indicator (RSSI) values may be used (block 1030). The RSSI values may be passed through a low pass filter 1031 to reduce noise and then used to calculate the long-term (e.g., 600 s) and/or the short-term (e.g., 10 s) variance based on the position of the antennas in the wireless device 100 (block 1032). The spatial signature (determined in block 1001), the degree of motion (determined in block 1005), the proximity and light readings (determined in block 1028), and the signal variance (determined in block 1032) are then combined to produce a 24 bit cognition signature, as shown in block 1034.

Figure 15:
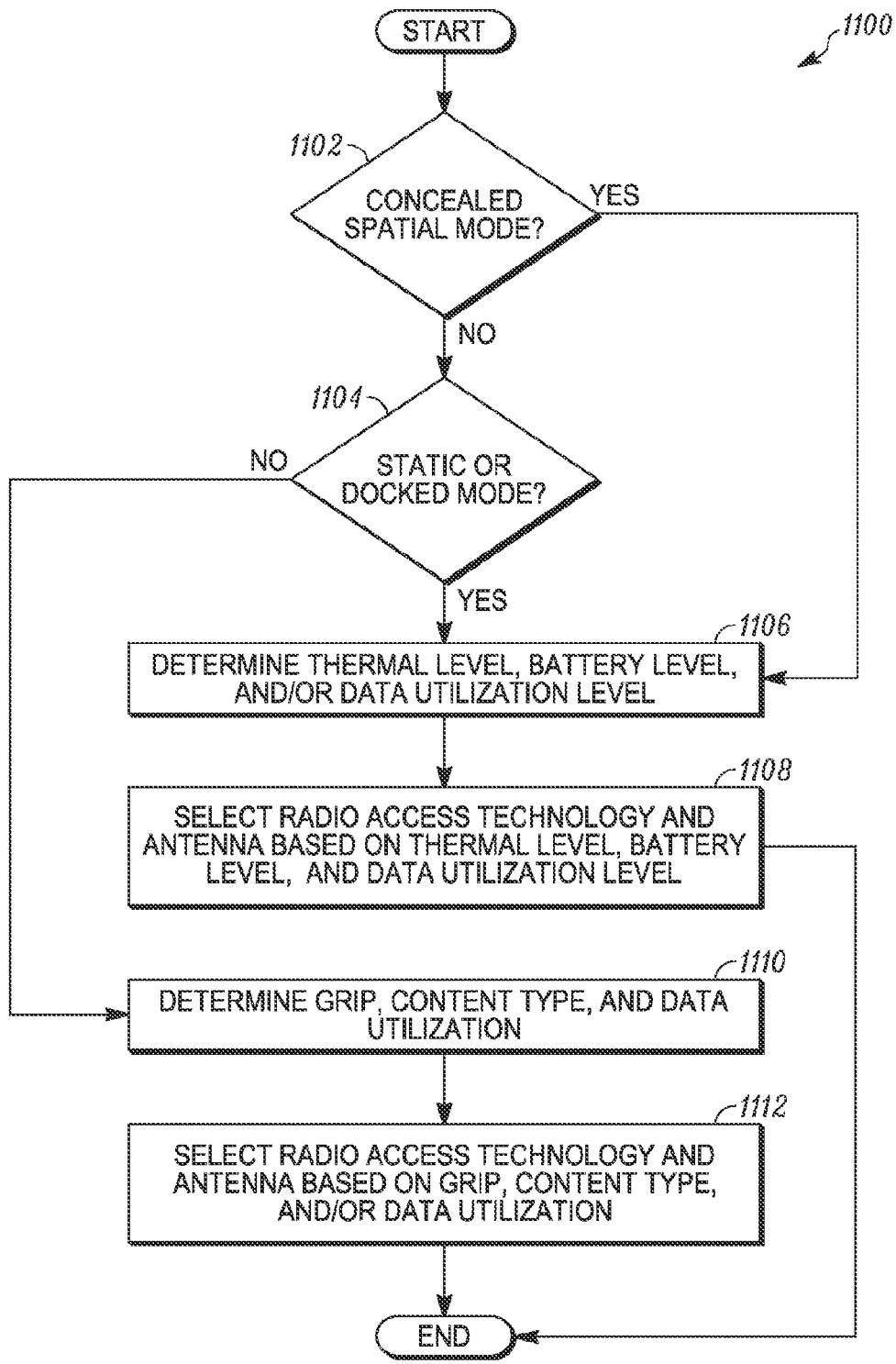
FIG. 15 is a flowchart of an example process for selecting a radio access technology based on a spatial mode of a wireless device.

A flowchart of an example process 1100 for selecting a radio access technology based on a spatial mode of a wireless device is illustrated in FIG. 15. The process 1100 may be carried out by one or more suitably programmed processors, such as a CPU executing software (e.g., block 304 of FIG. 3). The process 1100 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 1100 is described with reference to the flowchart illustrated in FIG. 15, it will be appreciated that many other methods of performing the acts associated with process 1100 may be used. For example, the order of many of the operations may be changed, and some of the operations described may be optional.

In this example, the process 1100 begins when the controller 102 determines if the spatial mode of the device 100 is a concealed spatial mode (e.g., in a purse or pocket) (block 1102). For example, the spatial mode of the device 100 may be determined as described above with reference to FIGS. 6-14. If the device 100 is not in a concealed spatial mode, the controller 102 determines if the device 100 is in a static or docked mode (e.g., the device 100 is effectively stationary) (block 1104). For example, this determination may be made as described above with reference to FIG. 13 and FIG. 14.

If the device 100 is in a concealed spatial mode, or the device 100 is in a static or docked mode, the controller 102 determines the thermal level, battery level, and data utilization level of the device 100 (block 1106). The controller 102 then selects a radio access technology and antenna based on the thermal level, battery level, and/or data utilization level of the device 100 (block 1108). For example, if the device 100 is concealed and data utilization is low (e.g., in a pocket and not in use), a low power radio access technology and associated antenna(s) may be selected in order to save power. However, if the device 100 is concealed and data utilization is high (e.g., in a pocket and streaming music), a higher power radio access technology and associated antenna(s) may be needed to access the data being used (e.g., music data). In some embodiments, the spatial information may also be used to adjust the automatic gain control of one or more receive antennas in order to balance any gain delta between receive antennas.

If the device 100 is not in a concealed spatial mode, and the device 100 is not in a static or docked mode, the controller 102 determines the grip, content type, and data utilization level of the device 100 (block 1110). The controller 102 then selects a radio access technology and antenna based on the grip, content type, and/or data utilization level of the device 100 (block 1112). For example, the controller 102 may determine if the spatial mode of the device 100 is most consistent with a right-hand grip, a left-hand grip, or a call grip. Based on the spatial mode of the device 100, the controller 102 selects the antenna 112, 114, 116 that is in a physical location that is the least shadowed by the grip (see FIG. 1 and FIG. 2 for example antenna placements). For example, if the device 100 is in a right hand grip, a left side antenna and associated radio access technology may be selected in order to increase signal strength. However, if the device 100 is executing content that is normally used by children (e.g., G rated movie or application), a lower power radio access technology and associated antenna(s) may be needed to reduce radio frequency exposure.

Figure 16:
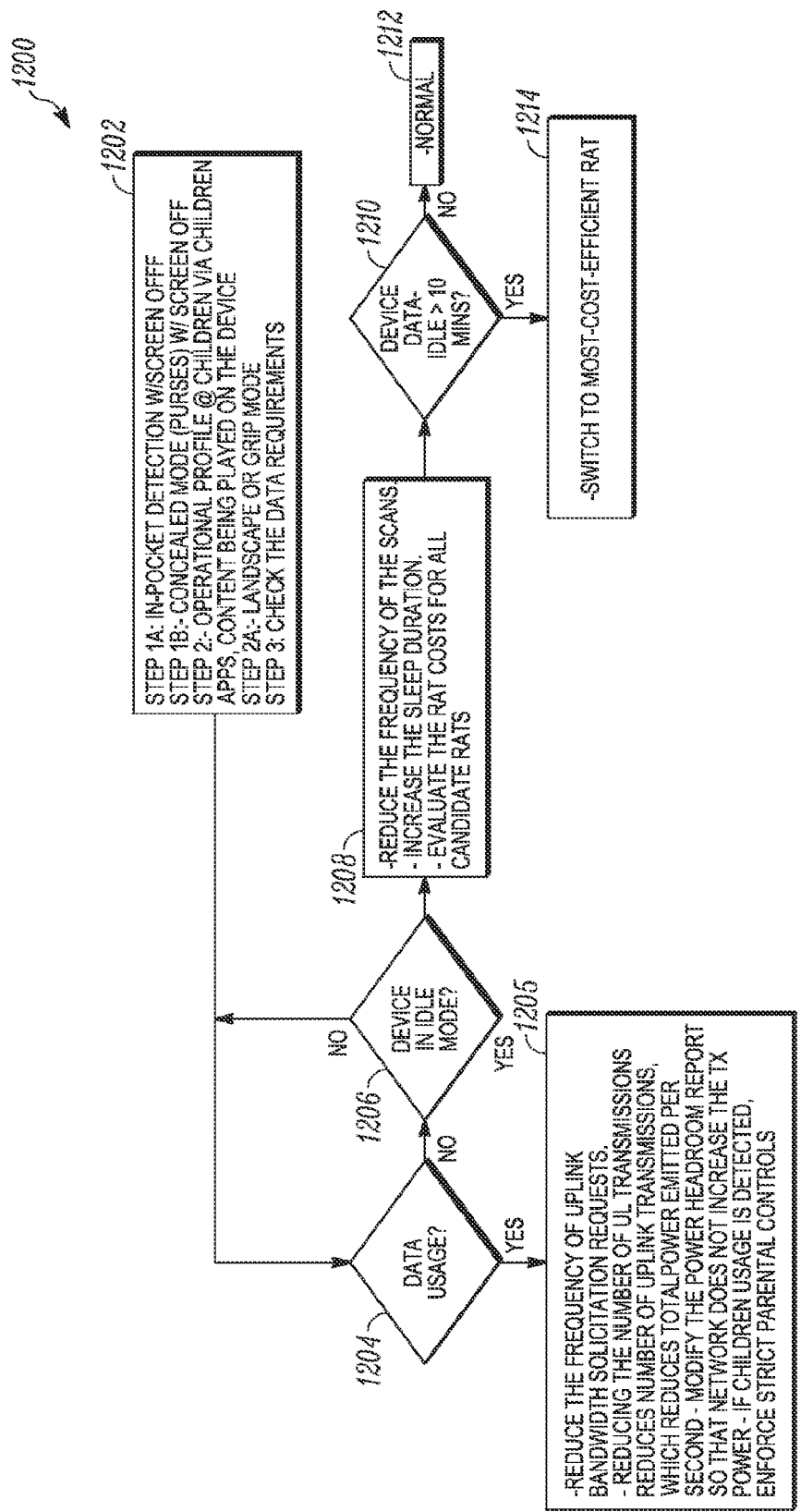
FIG. 16 is a flowchart of an example process for optimizing transmit power in a wireless device.

A flowchart of an example process 1200 for optimizing transmit power in a wireless device is illustrated in FIG. 16. The process 1200 may be carried out by one or more suitably programmed processors, such as a CPU executing software (e.g., block 304 of FIG. 3). The process 1200 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 1200 is described with reference to the flowchart illustrated in FIG. 16, it will be appreciated that many other methods of performing the acts associated with process 1200 may be used. For example, the order of many of the operations may be changed, and some of the operations described may be optional.

In this example, the controller 102 determines if the wireless device 100 is in a certain condition such as in the pocket or purse of the user (block 1202). For example, a proximity sensor or light sensor 104 may indicate that the device is concealed. The objective is to reduce the transmit costs and optimize transmit power when data utilization is below a certain threshold and the device is in a certain condition or a certain type of content is being played. Transmit cost may be reduce by either by throttling transmit packets or moving to a lower cost radio access technology. Throttling transmit packets reduces the transmit cost, because the power spectral density across time (e.g., transmit attempts per second) is reduced and this aids in optimizing the transmit path.

If the device 100 is in one of the predetermined conditions (e.g., in a pocket or purse), the controller 102 determines if the device 100 is currently using data (block 1204). If the device 100 is currently using data, the controller 102 makes certain adjustments to transmit power (block 1205). For example, the controller 102 may reduce the frequency of the uplink bandwidth solicitation requests. Similarly, the controller 102 may reduce the number of uplink transmissions and/or reduce the number of power emitted per second. Similarly, the controller 102 may modify the power headroom report, so that the network does not increase the transmit power. In another example, if the device 100 is in-pocket or being used by a child (e.g., based on a running application or content being classified as having a certain application age rating and/or a content age rating such as a children's game or a G rated movie), then the controller 102 may reduce transmit power and/or switch to a lower power radio access technology.

If the controller 102 determines that the device 100 is currently not using data (block 1204), the controller 102 determines if the device 100 is in an idle mode (block 1206). If the controller 102 determines that the device 100 is not in idle mode, the controller 102 again determines if the device 100 is currently using data (block 1204). In this manner, changes to critical call sustaining parameters are not made when the device 100 is active. If the controller 102 determines that the device 100 is in idle mode, the controller 102 reduces the frequency of scans, increases a sleep duration, and/or evaluates the radio access excess technology costs for candidate radio access technologies (block 1208). If the device 100 is in an idle mode for greater than a threshold period of time, such as 10 minutes (block 1210), the controller 102 may place the device 100 in a normal mode (block 1212). Otherwise, the controller 102 may attempt to switch the device 100 to a more cost-efficient radio access technology (block 1214). In some embodiments, the spatial information may also be used to adjust the automatic gain control of one or more receive antennas in order to balance any gain delta between receive antennas.

In summary, persons of ordinary skill in the art will readily appreciate that methods and apparatus for determining a transmit antenna gain and a spatial mode of a wireless device have been provided. Among other features, wireless devices using the disclosed methods and apparatus benefit from more balance uplink power that might otherwise suffer from path loss due to shadowing.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of determining a transmit antenna gain of a device, the method comprising:
    determining, by a controller of the device, a difference between at least a main receive antenna signal strength associated with a main receive antenna and a diversity receive antenna strength associated with a diversity receive antenna;
    determining, by the controller, a correction factor based on the difference;
    determining, by the controller, a spatial mode of the device at least based on the difference; and
    determining, by the controller, the transmit antenna gain based on the correction factor and the spatial mode.

2. The method of claim 1, wherein the diversity receive antenna is physically located between the main receive antenna and a transmit antenna.

3. The method of claim 1, wherein determining the difference between the at least main receive antenna signal strength and the diversity receive antenna strength is performed in real time.

4. The method of claim 1, wherein determining the correction factor includes determining if the difference between the at least main receive antenna signal strength and the diversity receive antenna strength exceeds a predetermined threshold.

5. The method of claim 4, wherein the predetermined threshold is indicative of an adjusted gain difference between the main receive antenna and the diversity receive antenna.

6. The method of claim 1, wherein determining the correction factor includes determining an indication of path loss.

7. The method of claim 1, wherein determining the correction factor includes determining at least one of an application age rating and a content age rating.

8. An apparatus for determining a transmit antenna gain, the apparatus comprising:
    a controller;
    a main receive antenna operatively coupled to the controller, the main receive antenna being associated with a first receive signal strength;
    a diversity receive antenna operatively coupled to the controller, the diversity receive antenna being associated with a second receive signal strength; and
    a transmit antenna operatively coupled to the controller, wherein the controller is structured to:
    determine a difference between the first receive signal strength and the second receive signal strength;
    determine a correction factor based on the difference;
    determining a spatial mode of the apparatus at least based on the difference; and
    determine the transmit antenna gain based on the correction factor and the spatial mode.

9. The apparatus of claim 8, wherein the diversity receive antenna is physically located between the main receive antenna and the transmit antenna.

10. The apparatus of claim 8, wherein the controller is structured to determine the difference between the first receive signal strength and the second receive signal strength in real time.

11. The apparatus of claim 8, wherein the controller is structured to determine the correction factor, at least in part, by determining if the difference between the first receive signal strength and the second receive signal strength exceeds a predetermined threshold.

12. The apparatus of claim 11, wherein the predetermined threshold is indicative of an adjusted gain difference between the main receive antenna and the diversity receive antenna.

13. The apparatus of claim 8, wherein the controller is structured to determine the correction factor, at least in part, by determining an indication of path loss.

14. The apparatus of claim 8, wherein the controller is structured to determine the correction factor, at least in part, by determining at least one of an application age rating and a content age rating.

15. The method of claim 1, wherein determining the spatial mode is further based on data received from at least one sensor of the device.

16. The apparatus of claim 8, further comprising:
    at least one sensor coupled to the controller, the at least one sensor configured to send data to the controller, wherein the controller determines the spatial mode of the apparatus based on the data received from the at least one sensor.

17. The apparatus of claim 16, wherein the at least one sensor comprises at least one of a proximity sensor, an accelerometer, and a direction/orientation sensor.

* * * * *